Patented Oct. 13, 1936

2,057,049

UNITED STATES PATENT OFFICE 2,057,049

PRESERVATION OF FOODS AND BEVERAGES

Michael Angelo O'Callaghan, Buenos Aires, Argentina

No Drawing. Application June 22, 1935, Serial No. 28,015. In Great Britain July 14, 1934

10 Claims. (Cl. 99—150)

The subject matter of the present invention is a novel method of preserving foods and beverages.

I discovered when studying the infusions and extracts of yerba maté, botanically known as Ilex paraguayensis, that such infusions and extracts have a very definite control over certain forms of organic decomposition, more especially in inhibiting the putrefactive decomposition of non-sterile substances rich in albumenoid or nitrogenous matter, such as aqueous solutions of lactic casein in which the lactic acid has been neutralized and the casein rendered soluble. When such solutions were allowed to stand at temperatures approaching blood heat—i. e. at about 37° C.— they rapidly became putrid, but when a small percentage of a concentrated infusion of yerba maté was added, the casein solutions either very slowly, or not at all, developed a putrefactive decomposition. As the casein was made from ordinary unboiled milk and had been coagulated in the milk by the development of an acid fermentation and allowed to remain in the milk serum under the action of this acid for several hours before it was neutralized and rendered soluble by the addition of an alkali, I considered it a most suitable medium to represent to some extent the processes which foods undergo during human digestion.

Bacteriological cultures containing the germs common to ordinary putrefactive fermentations were introduced into other solutions of neutralized casein and the results were of a similar character to that herein described.

Experiments of this latter character were carried out on meat broths and other food substances with a kindred result as far as inhibiting putrefaction was concerned.

Though I have worked almost entirely with matured or partly matured yerba maté obtained from cultivated plantations and dried as herein described, I do not claim that the infusions and extracts of cultivated yerba maté are more efficacious or otherwise than that obtained from uncultivated or wild yerba maté trees.

The ancient and still most general method, employed in South America, of preparing the yerba maté leaf is as follows:—

When the leaves are cut and pulled, they are momentarily toasted over a wood-fed fire in a revolving open wire cylinder and then transferred on top of a large umbrella-shaped structure and dried thus in the open air by the heat from a furnace or retort which is also fed with suitable wood. In this way the temperature never goes so high as to destroy the vitamines existing in the leaves. After being thus exposed to heat for some hours, generally 24 to 48 hours, the leaf which is now brittle and breaks easily is put away in bags or in dry rooms or silos and allowed to mature for any period up to two years or even longer.

I prefer to employ a method of drying at low temperatures such as just described to drying at high temperatures in ovens as is the practice in some parts of South America, as I have found the germs associated with yerba maté fermentation always active under the ancient method while frequently inactive in yerba maté quickly dried at high temperatures.

I hereby claim to have discovered by my researches, the anti-putrefactive qualities of infusions, extracts and essences made of or from the leaves of the tree known botanically as Ilex paraguayensis and commonly in South America as yerba maté.

According to the invention, the novel method of preserving foods and beverages especially those containing albumenoid or proteid matter, consists in adding to the food or beverage a convenient quantity of yerba maté, or an infusion, extract or essence thereof.

In making infusions of yerba maté and concentrating same, I prefer to use the lowest convenient temperatures if the concentration is done by heating at ordinary atmospheric pressure, and similarly if the concentration of the infusion is done under vacuum.

The leaf gives up its chief properties reasonably quickly at a temperature of 75 to 78° centigrade and very rapidly at a temperature of 90 to 95° centigrade (at ordinary atmospheric pressure).

I prefer to place the ground leaf in ordinary cold water, allow it to remain in same for from 3 to 12 hours then gradually raise the temperature to about 75° centigrade. If a concentrated infusion is desired the temperature is now brought to evaporation point conveniently about 85° C. meantime stirring the material. When it is decided that the yerba maté has given up its valuable properties to a full extent, the liquid is strained off and the heating of this latter continued until the desired degree of concentration is reached. Concentrated infusions made thus in water are extremely bitter to the taste and may be put away in bottles or other suitable containers and kept indefinitely.

If a concentrated infusion is to be made in milk, a similar proceeding may be followed, but it is desirable to first immerse the yerba maté in a small quantity of water for at least an hour and then transfer the contents to the milk, stirring repeatedly during the heating process, and adding sugar, honey or other sweetening or flavoring substances as desired, but preferably after the yerba maté has been removed by straining from the milky infusion, after which the concentration may be continued.

Such infusions may be dried to a powder if so desired by any suitable process.

In the appended claims, the term "extract" is defined as including also infusions and essences; also the term "proteid content" is defined as including any albumenoid or proteid matter liable to cause spoiling of foodstuffs and beverages.

I claim:

1. A method of preserving foods and beverages, comprising adding a convenient quantity of yerba maté thereto.

2. A method of preserving foods and beverages, comprising adding a quantity of a liquid extract of yerba maté thereto.

3. A method of preserving foods and beverages, comprising adding thereto a quantity of yerba maté in the form of an extract prepared from yerba maté dried at low temperature.

4. As a new composition of matter, a foodstuff with proteid content containing a sufficient quantity of yerba maté to act as a preservative.

5. As a new composition of matter, a beverage with proteid content containing a sufficient quantity of yerba maté to act as a preservative.

6. A method of preparing a powdered milk product, comprising adding yerba maté leaf to milk, treating the mixture to remove extractable material from the leaves, removing the leaves, and concentrating the resulting liquid to a powder.

7. A powdered milk product containing yerba maté as a preservative.

8. A method of inhibiting putrefaction of meat broth, comprising adding an extract of yerba maté thereto.

9. A food product consisting of a meat extract and an extract of yerba maté.

10. A method of inhibiting putrefactive decomposition of non-sterile substances rich in albumenoid or nitrogenous matter, comprising incorporating an extract of yerba maté in the substance.

MICHAEL ANGELO O'CALLAGHAN.